Figure 1:
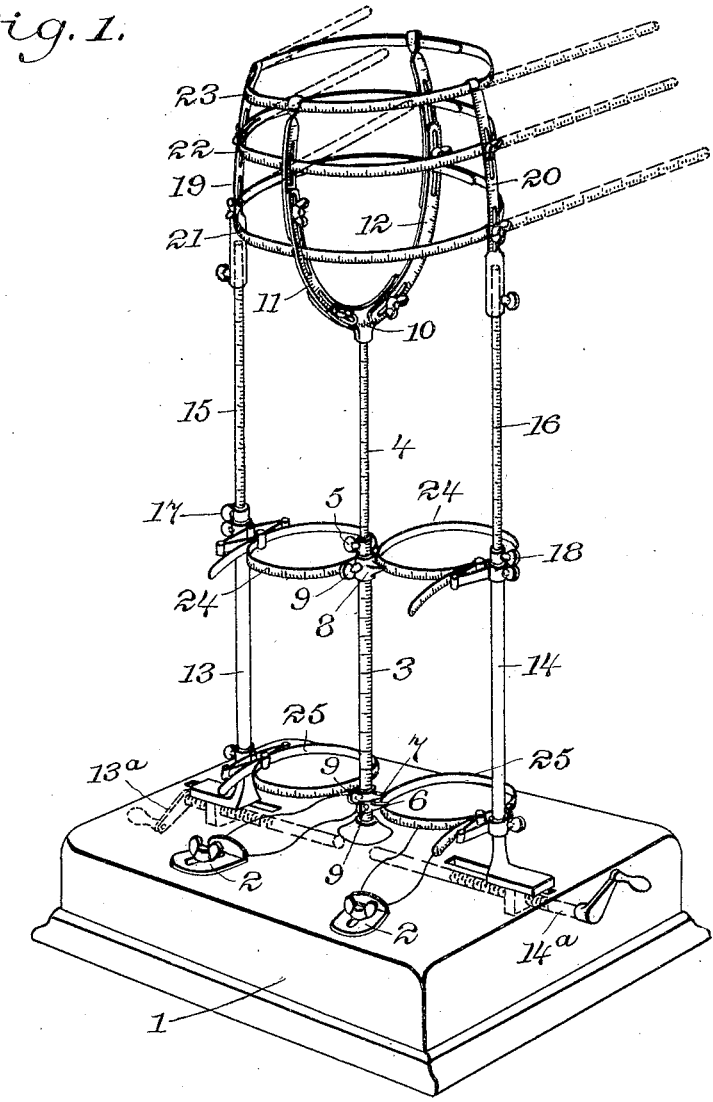

No. 791,039. PATENTED MAY 30, 1905.
W. C. MERTZ.
TROUSERS MEASURING DEVICE.
APPLICATION FILED DEC. 18, 1902.

2 SHEETS—SHEET 1.

WITNESSES:
Allen Ross
Henrietta Stulz

INVENTOR
William Corrigan Mertz
BY
Eugene Bear
ATTORNEY

No. 791,039. PATENTED MAY 30, 1905.
W. C. MERTZ.
TROUSERS MEASURING DEVICE.
APPLICATION FILED DEC. 18, 1902.
2 SHEETS—SHEET 2.
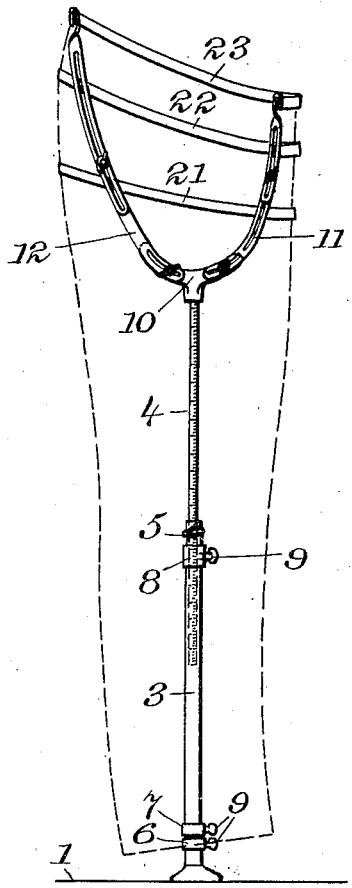
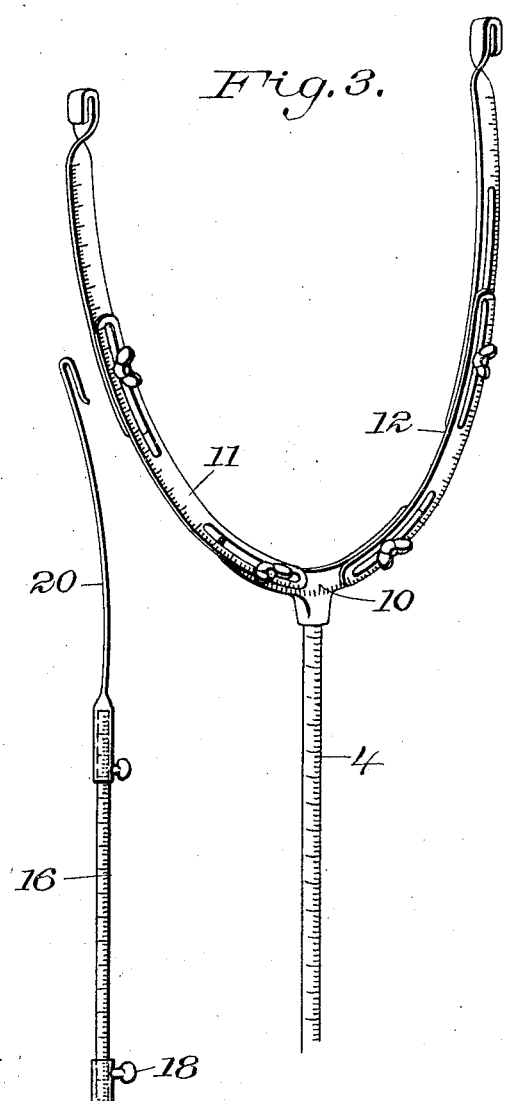
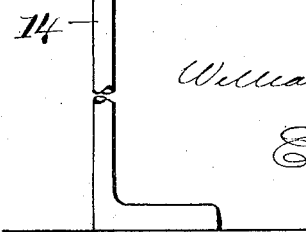
WITNESSES:
Allen Ross
Henrietta Stulz
INVENTOR
William Corrigan Mertz
BY
Eugene Berry
ATTORNEY No. 791,039.

Patented May 30, 1905.

UNITED STATES PATENT OFFICE.

WILLIAM CORRIGAN MERTZ, OF NEW YORK, N. Y.

TROUSERS-MEASURING DEVICE.

SPECIFICATION forming part of Letters Patent No. 791,039, dated May 30, 1905.

Application filed December 18, 1902. Serial No. 135,760.

*To all whom it may concern:*

Be it known that I, WILLIAM CORRIGAN MERTZ, residing at New York, in the county of New York and State of New York, have invented a new and useful Improvement in Trousers-Measuring Devices, of which the following is a specification.

My invention relates to apparatus for obtaining the various measurements required in cutting and making trousers.

The preferred form of apparatus embodying my invention is illustrated in the accompanying drawings, throughout the several views of which like numerals of reference indicate corresponding parts.

In the drawings, Figure 1 is a view in perspective of the apparatus. Fig. 2 is a central vertical sectional view thereof. Fig. 3 is a detail view in perspective of the inseam and crotch measuring rods and tapes, and Fig. 4 is a similar view of the side-seam-measuring rod and tape.

Referring to the drawings, 1 represents a platform or base upon which the person whose measurement is to be taken stands, foot-marks being provided thereon, together with adjustable toe-plates 2 2 to assist him in assuming proper position.

For the measurement of the inseam and crotch there is provided about centrally of these foot-marks an upright 3, of predetermined length, which is rigidly mounted on the platform, the same being tubular to receive a telescoping rod 4, having linear scale-markings thereon, representing inches and fractions of an inch. The rod 4 is secured in any position of adjustment by means of a set-screw 5. A series of pointers 6, 7, and 8, each formed in part with a collar adjustably secured upon the upright 3 by means of set-screws 9 9 9, &c., are employed by indicating the "heel length," "instep length," and "knee," requisite scale-markings being provided on the upright for this purpose. The upper end of the rod 4 terminates in a fork 10, to which are secured the extensible measuring-tapes 11 and 12 for the crotch. These metal tapes may be secured rigidly or, if preferred, loosely by a pin-and-slot connection. Each tape consists of two members extensibly connected by a slot and set-screw to enable them to be adjusted as required and secured as adjusted. The upper member of each of these tapes terminates in a hook for a purpose to be later on explained.

For the measurement of the side seams twin uprights 13 and 14 are mounted upon the platform and are adjustable toward or away from each other by means of cranks and screw-shafts 13$^a$ 14$^a$, each upright having a lug projecting through a slot in the platform and tapped for engagement with the screw-shafts, the threads on which are "right" and "left" to provide the desired adjustment when the shafts are rotated by means of the cranks. Telescoping in these uprights are scaled rods 15 and 16, which may be secured in any position of adjustment by means of set-screws 17 and 18. These rods 15 16 are adjustably secured by set-screws in the socketed ends of metallic tapes 19 and 20.

For the measurement of the waist, abdomen, and seat three metallic tapes 21, 22, and 23 are employed. These tapes are adjustably secured by slot-and-set-screw connection with the side-seam-measuring tapes and are scaled in the usual manner, so that their overlapping ends at the rear will indicate "full width" for the seat, abdomen, and waist.

For the measurement of the girth at the knee and instep metallic tapes 24 24 and 25 25 are employed, the same being carried by collars adjustably secured upon the uprights 13 and 14 by set-screws.

The operation is as follows: With the tapes 21, 22, and 23 open, as indicated by dotted lines in Fig. 1, the person to be measured mounts the platform and with the foot-marks as a guide for the position of his feet assumes his natural pose. The tape 23 is then adjusted about his waist to determine the position of the waistband and also the girth, and the ends of the tape 21 and 22 are overlapped for the seat and abdomen measure. The rod 4 is then adjusted to bring the forked end in position to determine the inseam measurement. The pointers 6, 7, and 8 are next adjusted for the heel length, instep length, and knee, and the girth at the knee and instep is obtained by means of the tapes 24 25, &c. The extensible tapes 11 and 12 are lengthened or shortened, as required, and their hooked upper ends caught over the waist-tape 23. Having thus determined all of the measurements required except the side seams, the operation is completed by adjusting the rods and tapes 15, 16, 19, and 20. After the full width measure for the waist, abdomen, and seat have been noted the ends of these tapes may be separated, as indicated in dotted lines in Fig. 1, and the person allowed to step from the platform without disturbing any of the other measurements, which may be subsequently noted at any convenient time.

Some of the main advantages of the invention are as follows: The dimensions of cloth for the crotch is indicated and the exact seat-opening shown. The position of the hips with relation to the feet—that is to say, any projection of the hips beyond the feet—is also shown, thereby giving the accurate measurements of the body and showing the amount of cloth required at the hips and crotch which will produce the proper swing and hang of the legs, &c., which is essential to perfect-fitting trousers.

Having thus described my invention, I claim—

1. In measuring apparatus for trousers, the combination of a plurality of telescoping uprights relatively disposed and adjustable to indicate inseam and side-seam measurements, the inseam-measuring upright being bifurcated at its upper end and a series of coöperating tapes adapted to indicate the girth at suitable points within the length of the bifurcated portion of said upright.

2. In measuring apparatus of the class described the combination of a plurality of telescoping uprights adjustable to indicate respectively inseam and side-seam measurements, one of said uprights being bifurcated at its upper end and provided with extensible continuations, flexible extensions forming continuations of the remaining uprights and a series of adjustable tapes coöperating with said extensible continuations and flexible extensions of the uprights and adapted to indicate the waist, hip and seat girth.

3. In measuring apparatus of the class described the combination of a plurality of telescoping uprights adjustable to indicate respectively inseam and side-seam measurements, one of said uprights being bifurcated at its upper end and provided with extensible continuations, flexible extensions forming continuations of the remaining uprights and a series of adjustable tapes coöperating with said extensible continuations and flexible extensions of the uprights and adapted to indicate the waist, hip and seat girth together with adjustable tapes for determining the knee and instep girth.

In testimony whereof I affix my signature in the presence of two witnesses.

WILLIAM CORRIGAN MERTZ.

Witnesses:
ALLEN ROSS,
HENRIETTA STULZ.